US010065506B2

(12) United States Patent
Katsuta (10) Patent No.: US 10,065,506 B2
(45) Date of Patent: Sep. 4, 2018

(54) HYBRID BRAKE CONTROL

(71) Applicant: TOYOTA JIDOSHA KABUSHIKI KAISHA, Toyota-shi, Aichi (JP)

(72) Inventor: Hiroshi Katsuta, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 31 days.

(21) Appl. No.: 15/115,399

(22) PCT Filed: Jan. 12, 2015

(86) PCT No.: PCT/IB2015/000014
§ 371 (c)(1),
(2) Date: Jul. 29, 2016

(87) PCT Pub. No.: WO2015/114430
PCT Pub. Date: Aug. 6, 2015

(65) Prior Publication Data
US 2017/0008400 A1    Jan. 12, 2017

(30) Foreign Application Priority Data
Jan. 31, 2014  (JP) ................. 2014-017247

(51) Int. Cl.
*B60L 3/00* (2006.01)
*B60L 3/10* (2006.01)
(Continued)

(52) U.S. Cl.
CPC ............ *B60L 3/0015* (2013.01); *B60L 3/102* (2013.01); *B60L 3/108* (2013.01); *B60L 7/14* (2013.01);
(Continued)

(58) Field of Classification Search
None
See application file for complete search history.

(56) References Cited

U.S. PATENT DOCUMENTS 6,086,166 A  *  7/2000  Fukasawa  ............. B60L 3/0023
                                                    303/122.04
2007/0228822 A1   10/2007  Hirata
(Continued)

FOREIGN PATENT DOCUMENTS

DE    102007038059 A1    2/2009
DE    102008051001 A1    4/2010
(Continued)

OTHER PUBLICATIONS

Espacenet machine translation of JPH06171489.*

*Primary Examiner* — Jelani A Smith
*Assistant Examiner* — Paul A Castro
(74) *Attorney, Agent, or Firm* — Hunton Andrews Kurth LLP (57) ABSTRACT

A vehicle includes a friction brake, a regenerative brake, and an ECU. The ECU is configured to: (a) control a total braking force that is generated in the vehicle; (b) execute first brake control for controlling a braking force of the vehicle on the basis of the brake operation amount; (c) determine based on the brake operation amount whether the driver's brake operation is being carried out; (d) when the ECU determines that the driver's brake operation is not being carried out, execute second brake control for automatically controlling the braking force of the vehicle in response to a condition of the vehicle, other than the brake operation amount; and (e) when the second brake control is executed, reduce a proportion of a braking force of the regenerative brake within the total braking force as compared to when the first brake control is executed.

3 Claims, 6 Drawing Sheets

(51) Int. Cl.
  *B60T 8/176* (2006.01)
  *B60T 1/10* (2006.01)
  *B60T 7/04* (2006.01)
  *B60T 7/12* (2006.01)
  *B60T 7/22* (2006.01)
  *B60W 30/18* (2012.01)
  *B60W 20/14* (2016.01)
  *B60L 7/14* (2006.01)
  *B60L 7/26* (2006.01)
  *B60L 11/12* (2006.01)
  *B60L 11/14* (2006.01)
  *B60L 11/18* (2006.01)
  *B60L 15/20* (2006.01)

(52) U.S. Cl.
  CPC ............... *B60L 7/26* (2013.01); *B60L 11/123* (2013.01); *B60L 11/14* (2013.01); *B60L 11/1861* (2013.01); *B60L 15/2009* (2013.01); *B60T 1/10* (2013.01); *B60T 7/042* (2013.01); *B60T 7/12* (2013.01); *B60T 7/22* (2013.01); *B60T 8/176* (2013.01); *B60W 20/14* (2016.01); *B60W 30/18127* (2013.01); *B60L 2210/10* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/461* (2013.01); *B60L 2240/527* (2013.01); *B60L 2240/545* (2013.01); *B60L 2240/547* (2013.01); *B60L 2240/549* (2013.01); *B60L 2240/80* (2013.01); *B60L 2250/24* (2013.01); *B60L 2250/26* (2013.01); *B60T 2201/022* (2013.01); *B60T 2270/604* (2013.01); *Y02T 10/6217* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/7216* (2013.01); *Y02T 10/7241* (2013.01); *Y02T 10/7275* (2013.01)

(56) References Cited

U.S. PATENT DOCUMENTS

| 2014/0018986 | A1 | | 1/2014 | Azzi |
| 2014/0046567 | A1 | | 2/2014 | Schuler |
| 2016/0264003 | A1 | * | 9/2016 | Yokoyama ............... B60K 6/52 |

FOREIGN PATENT DOCUMENTS

| DE | 102010052964 A1 | | 5/2012 |
| EP | 1839985 A2 | | 10/2007 |
| FR | 2971460 A1 | | 8/2012 |
| JP | 06171489 A | * | 6/1994 |
| JP | H06-171489 A | | 6/1994 |
| JP | 3438242 B2 | | 8/2003 |
| JP | 2007-295784 A | | 11/2007 |
| JP | 2008-265397 A | | 11/2008 |
| JP | 2011-006027 A | | 1/2011 |

* cited by examiner

HYBRID BRAKE CONTROL

CROSS-REFERENCE TO RELATED APPLICATIONS

This is a national phase application based on the PCT International Patent Application No. PCT/IB2015/000014 filed Jan. 12, 2015, claiming priority to Japanese Patent Application No. 2014-017247 filed Jan. 31, 2014, the entire contents of both of which are incorporated herein by reference.

BACKGROUND OF THE INVENTION

1. Field of the Invention

The invention relates to a vehicle and, more particularly, to a vehicle including a regenerative brake and a friction brake.

2. Description of Related Art

Japanese Patent No. 3438242 describes an electric vehicle. The electric vehicle includes a brake system that improves fuel consumption by converting energy during deceleration of the vehicle to electric energy. When an anti-lock brake system is activated while the vehicle is being decelerated by using regenerative braking and friction braking through driver's operation of a brake pedal, the brake system reduces the proportion of regenerative braking.

In a state where both regenerative braking and friction braking are used, it is required to switch braking force from regenerative braking to friction braking in order to obtain large braking force. This switching of braking force is preferably gradually carried out in order to suppress a change in total braking force. Therefore, when regenerative braking is activated at a large proportion for the purpose of improvement in fuel consumption, there is an inconvenience that switching of braking force takes time.

On the other hand, there is known a system that executes automatic brake control for generating braking force in a vehicle on the basis of an operating state of the vehicle, other than driver's brake pedal operation. Such a system is mostly used in order to avoid a danger in the case where no driver's brake pedal operation is detected. Therefore, desired braking is different between braking caused by driver's operation and braking caused by the system; however, the brake system described in Japanese Patent No. 3438242 does not take such a point into consideration.

SUMMARY OF THE INVENTION

The invention provides a vehicle that is able to reduce a braking distance during automatic brake control.

An aspect of the invention provides a vehicle. The vehicle includes a brake operation detector, a friction brake, a regenerative brake, and an electronic control unit (ECU). The brake operation detector is configured to detect a driver's brake operation amount. The ECU is configured to: (a) control a total braking force that is generated in the vehicle by controlling the friction brake and the regenerative brake; (b) execute first brake control for controlling a braking force of the vehicle on the basis of the brake operation amount; (c) determine based on the brake operation amount whether the driver's brake operation is being carried out; (d) when the ECU determines that the driver's brake operation is not being carried out, execute second brake control for automatically controlling the braking force of the vehicle in response to a condition of the vehicle, other than the brake operation amount; and (e) when the second brake control is executed, reduce a proportion of a braking force of the regenerative brake within the total braking force as compared to when the first brake control is executed.

When the proportion of the braking force of the regenerative brake is high, it is advantageous in reducing a fuel consumption. On the other hand, when the proportion of the braking force of the regenerative brake is low, because a replacement amount in process of replacing the braking force of the regenerative brake with the braking force of the friction brake becomes small, controllability is high, and it is possible to reduce the braking distance. According to the above aspect, the amount of regeneration is ensured by a large amount by placing importance on fuel consumption during first brake control (during ordinary brake control); however, it is possible to reduce the braking distance by placing importance on controllability by reducing the amount of regeneration during second brake control (during automatic brake control).

In the above aspect, the ECU may be configured to execute stop control for controlling the total braking force so as to stop the vehicle in response to a stop request for the vehicle or deceleration control for controlling the total braking force so as to decelerate the vehicle in response to a deceleration request for the vehicle as the second brake control. The ECU may be configured to, when the deceleration control is executed, control the total braking force by using both the regenerative brake and the friction brake. The ECU may be configured to, when the stop control is executed, control the proportion of the braking force of the regenerative brake within the total braking force to zero.

According to the above aspect, the proportion of the braking force of the regenerative brake is set to zero from the beginning when stop control is executed, so it is not required to switch the braking force from the regenerative brake to the friction brake at the time of a stop, and it is possible to reduce the braking distance. On the other hand, it is not required to place importance on the braking distance when deceleration control is executed, so it is possible to improve the fuel consumption by also carrying out regeneration.

In the above aspect, the ECU may include a first ECU and a second ECU configured to communicate with each other. The first ECU may be configured to generate the stop request. The first ECU may be configured to calculate a required braking force and control the friction brake at the time of executing the first brake control on the basis of the brake operation amount. The second ECU may be configured to calculate a regenerative braking force that is generated by the regenerative brake and transmit the regenerative braking force back to the first ECU in response to a command received from the first ECU. The first ECU may be configured to, when the stop request is generated, control the friction brake irrespective of a response from the second ECU.

According to the above aspect, the first ECU executes brake control without waiting for a response from the second ECU during second brake control (automatic brake control), so it is possible to reduce a control time corresponding to a delay in communication resulting from coordinated control with the regenerative brake during second brake control.

In the above aspect, the vehicle may further include a vehicle surrounding situation detector. The vehicle surrounding situation detector may be configured to detect deceleration of a preceding vehicle and a collision object having a possibility of collision with the vehicle. The ECU may be configured to, when the vehicle surrounding situation detector detects that the preceding vehicle has decelerated during vehicle follow-up traveling, generate the deceleration request. The ECU may be configured to, when the vehicle surrounding situation detector detects the collision object having a possibility of collision with the vehicle, generate the stop request. The vehicle surrounding situation detector may include an inter-vehicle sensor and a camera configured to monitor a situation ahead of the vehicle.

According to the invention, it is possible to reduce the braking distance during automatic brake control while improving the fuel consumption by using the regenerative brake as much as possible.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings. Like reference numerals denote the same or corresponding portions in the drawings, and the description thereof will not be repeated.

Description of Outline of Vehicle Including Brake System

Figure 1:
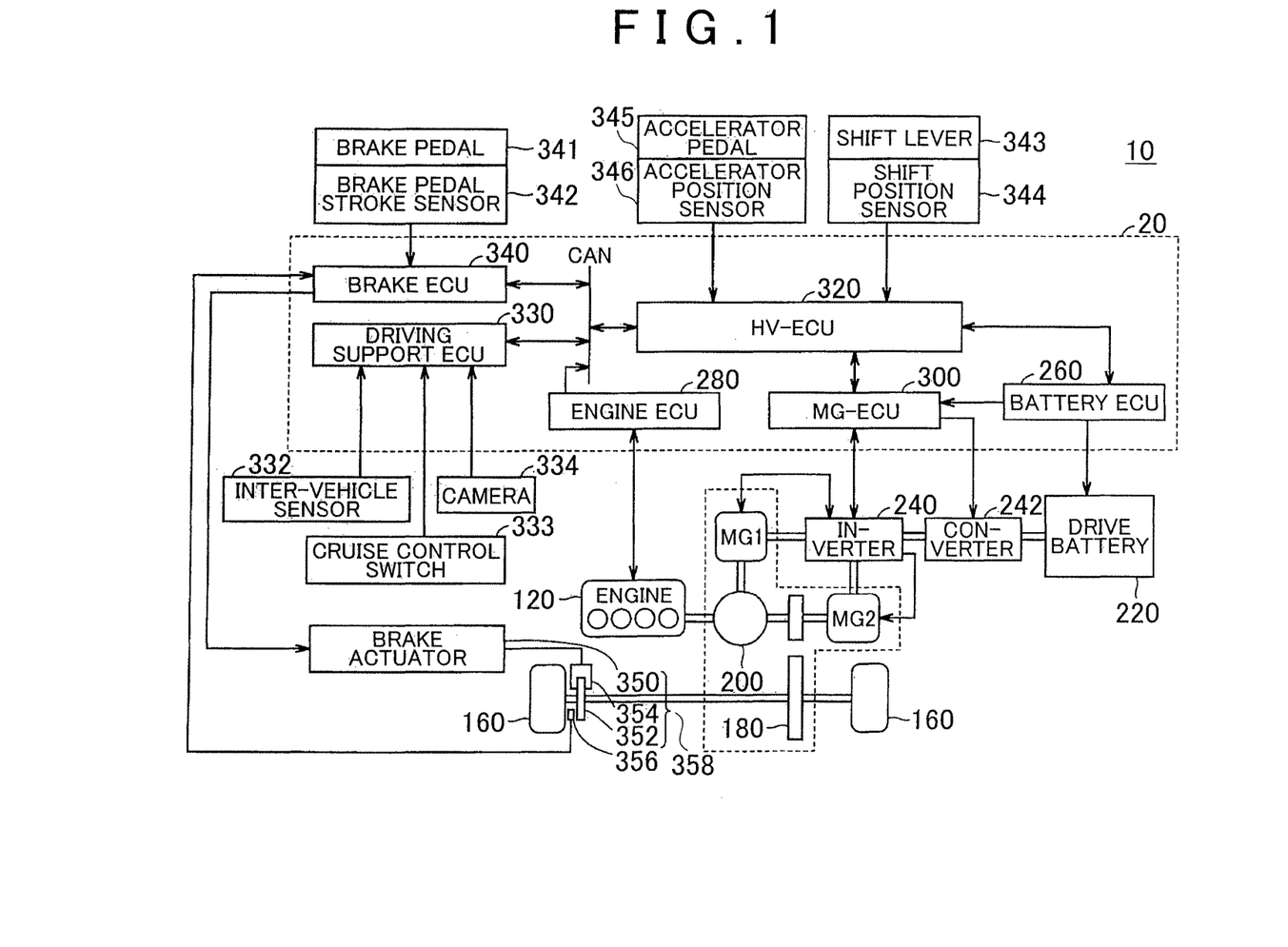
FIG. 1 is a block diagram that shows the major configuration of a vehicle according to an embodiment.

FIG. 1 is a block diagram that shows the major configuration of a vehicle according to the embodiment. As shown in FIG. 1, the vehicle 10 according to the present embodiment includes a brake pedal 341 (brake operating unit), a friction brake 358, a regenerative brake and a control unit 20. The brake pedal 341 is operated by a driver. The regenerative brake uses a motor generator MG2. The control unit 20 controls the total braking force that is generated in the vehicle 10 by using the friction brake 358 and the regenerative brake. The control unit 20 executes ordinary brake control or automatic brake control. In the ordinary brake control, the vehicle is braked on the basis of an operation amount of the brake pedal 341. In the automatic brake control, the vehicle is automatically braked. When the control unit 20 starts automatic brake control in the case where the brake pedal 341 is not operated, the control unit 20 executes control so that the proportion of braking force of the regenerative brake within the total braking force is smaller than that in the case where ordinary brake control is executed.

When the proportion of braking force of the regenerative brake is high, it is advantageous to reduce a fuel consumption. On the other hand, when the proportion of braking force of the regenerative brake is low, because a replacement amount in process of replacing the braking force of the regenerative brake with the braking force of the friction brake 358 becomes small, controllability is high, and it is possible to reduce the braking distance. With the above configuration, the amount of regeneration is ensured by a large amount by placing importance on fuel consumption during ordinary brake control, and it is possible to reduce the braking distance by placing importance on controllability during automatic brake control.

Figure 4:
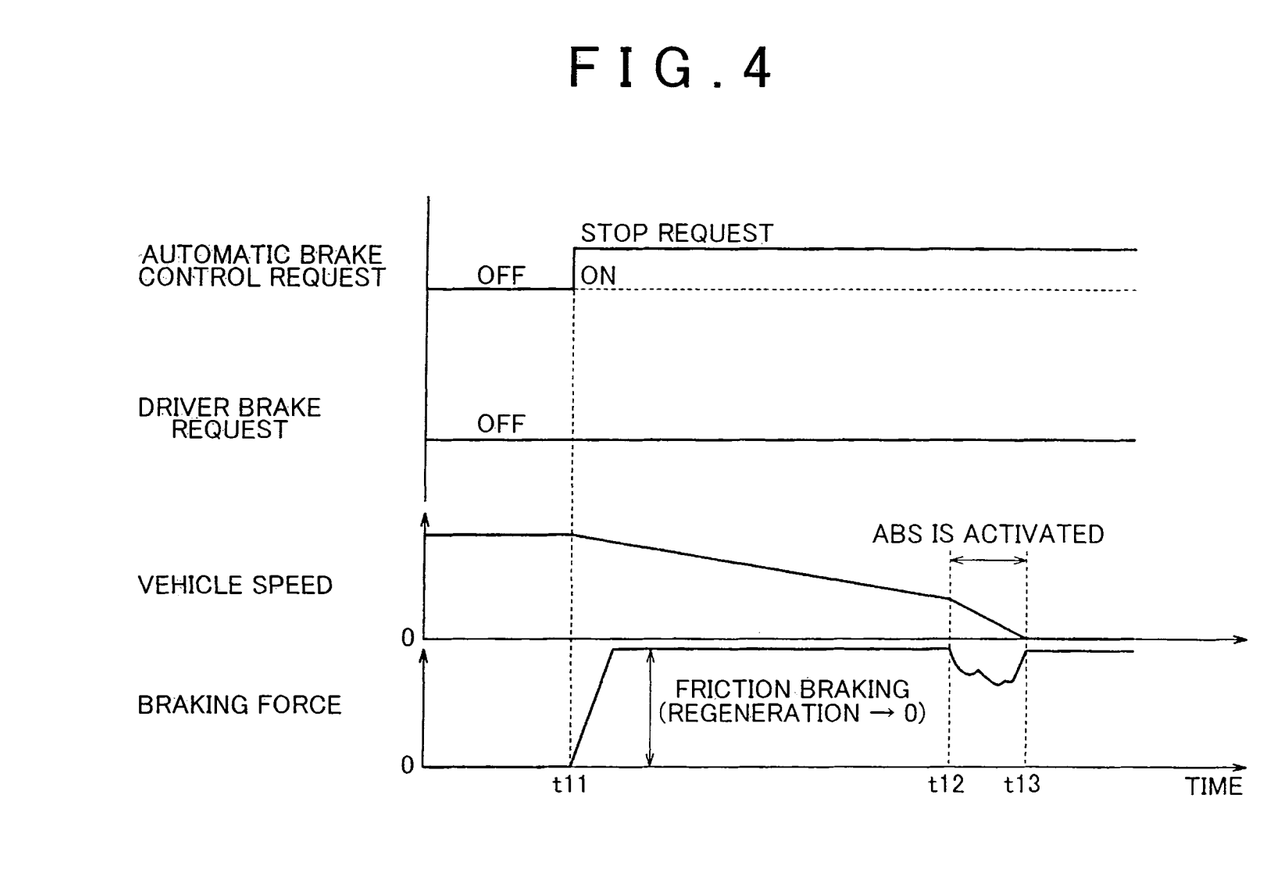
FIG. 4 is an operation waveform chart of brake control when pre-crash brake is activated (when a stop request is issued)
Figure 5:
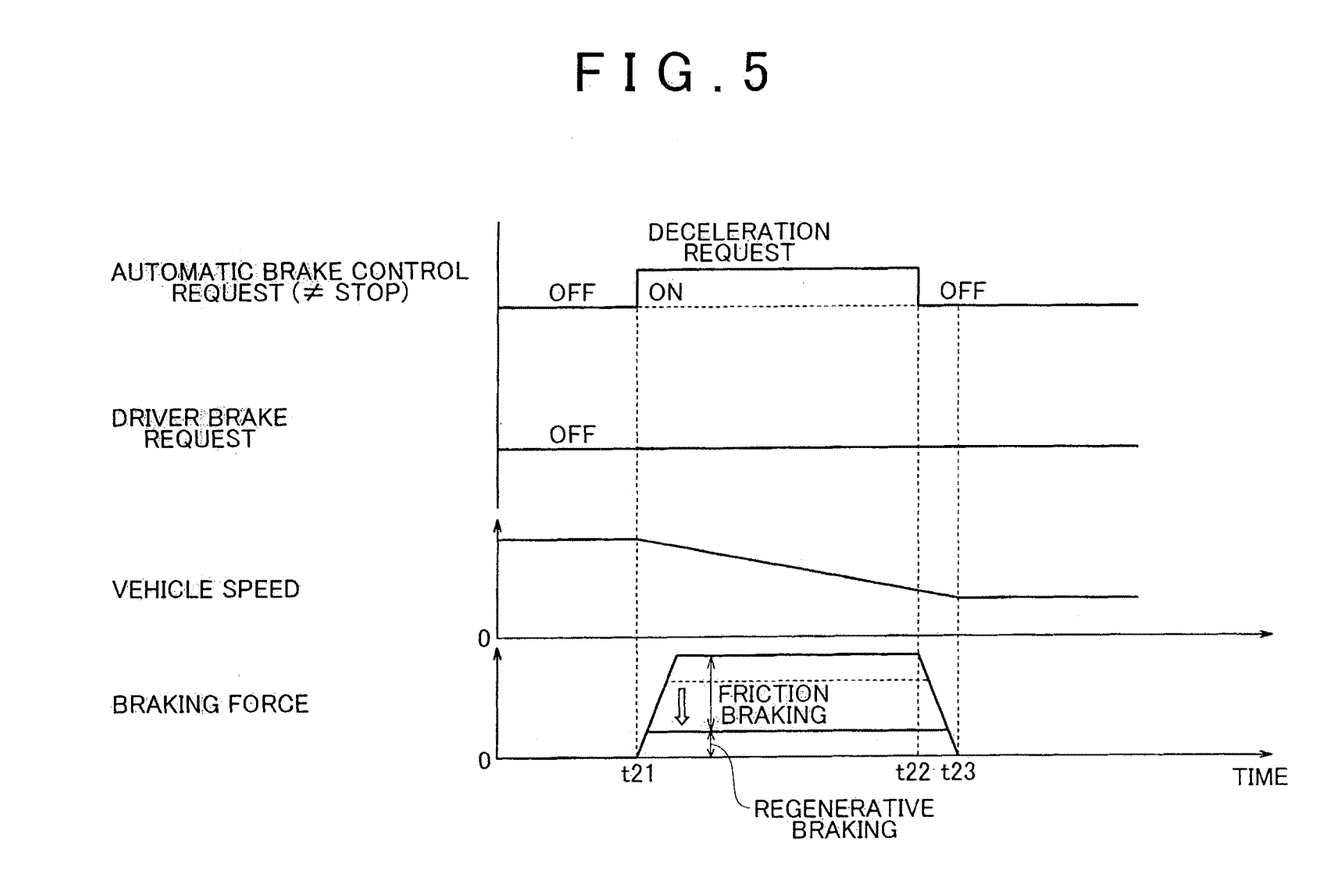
FIG. 5 is an operation waveform chart of brake control when a deceleration request is issued during automatic cruise control.

Preferably, the automatic brake control includes stop control and deceleration control. The stop control is started in response to a stop request for the vehicle, as illustrated in FIG. 4. The deceleration control is started in response to a deceleration request for the vehicle, as illustrated in FIG. 5. When the control unit 20 executes deceleration control, the control unit 20 generates the total braking force by using both the regenerative brake and the friction brake as shown from time t21 to time t23 in FIG. 5. When the control unit 20 executes stop control, the control unit 20 sets the proportion of braking force of the regenerative brake within the total braking force to zero as shown from time t1 in FIG. 4.

With the above configuration, because the proportion of braking force of the regenerative brake is set to zero from the beginning during stop control, it is not required to replace the braking force of the regenerative brake with the braking force of the friction brake, so it is possible to reduce the braking distance.

More preferably, the control unit 20 includes a driving support electronic control unit (ECU) 330 (determination unit), a brake ECU 340 (brake control unit) and an HV-ECU 320 (regeneration control unit). The driving support ECU 330 generates the stop request. The brake ECU 340 calculates a required braking force during ordinary brake control by detecting the operation amount of the brake pedal 341, and controls the friction brake 358. The HV-ECU 320 determines the proportion of braking force generated between the friction brake 358 and the regenerative brake upon reception of the required braking force, and transmits information (for example, proportion) about braking force generated by the regenerative brake back to the brake ECU 340 in response to a command from the brake ECU 340. When the brake ECU 340 has received the stop request from the driving support ECU 330, the brake ECU 340 activates the friction brake 358 irrespective of a response from the HV-ECU 320.

With the above configuration, the brake ECU 340 executes brake control without waiting for a command from the HV-ECU 320 during automatic brake control. Therefore, it is possible to reduce a control time corresponding to a delay in communication resulting from coordinated control with the regenerative brake during automatic brake control.

More preferably, when the control unit 20 detects that a preceding vehicle has decelerated during preceding vehicle follow-up traveling, the control unit 20 generates the deceleration request as shown in FIG. 5. When the control unit 20 detects a collision object having a possibility of collision with the vehicle, the control unit 20 generates the stop request as shown in FIG. 4.

Next, the components of the vehicle 10 will be further described in detail.

Detailed Configuration of Vehicle 10 An example in which the vehicle is a hybrid vehicle will be described in the following embodiment. However, the vehicle may be any one of a hybrid vehicle, an electric vehicle and a fuel cell vehicle.

A control block diagram of the hybrid vehicle according to the embodiment of the invention will be described with reference to FIG. 1.

The hybrid vehicle 10 includes an internal combustion engine (hereinafter, referred to as engine) 120, and motor generators MG1, MG2. The internal combustion engine 120 serves as a driving source. The motor generators MG1, MG2 serve as rotary electric machines. In the following description, the motor generator MG1 is referred to as the generator MG1, and the motor generator MG2 is referred to as the motor MG2. However, the generator MG1 functions as a motor or the motor MG2 functions as a generator in accordance with the traveling state of the hybrid vehicle 10.

The engine 120 includes a plurality of cylinders and fuel injection devices. Each of the fuel injection devices supplies fuel to a corresponding one of the plurality of cylinders. Each of the fuel injection devices injects fuel to the corresponding cylinder in an appropriate amount at appropriate timing on the basis of a fuel injection control signal from the engine ECU 280.

An intake air amount, an electronic throttle opening degree, and the like, are input to the engine ECU 280. The intake air amount is detected by an air flow meter (not shown). The electronic throttle opening degree is detected by a throttle position sensor.

A signal indicating an engine coolant temperature is input from a coolant temperature detection sensor to the engine ECU 280. The coolant temperature detection sensor detects the temperature of coolant of the engine 120. A crank position sensor is provided on an output shaft of the engine 120. A signal indicating a rotation speed of the output shaft is input from the crank position sensor to the engine ECU 280.

The hybrid vehicle 10 further includes a reduction gear 180 and a power split mechanism 200. The reduction gear 180 transmits power, generated by the engine 120, the motor generator MG1 or the motor generator MG2, to drive wheels 160 or transmits rotational force of the drive wheels 160 to the engine 120, the motor generator MG1 or the motor generator MG2. The power split mechanism 200 is, for example, a planetary gear train, and distributes power generated by the engine 120 to two routes, that is, the drive wheels 160 (that is, the motor MG2) and the generator MG1. For example, a sun gear of the planetary gear train is connected to the generator MG1, a carrier is connected to the engine 120, and a ring gear is connected to the motor MG2. A shift mechanism may be provided between the ring gear and the motor MG2.

The hybrid vehicle 10 further includes a drive battery 220 and an inverter 240. The drive battery 220 supplies driving electric power to the motor generators MG1, MG2. Instead of the drive battery, a capacitor, or the like, may be used as an electrical storage device. The inverter 240 executes current control while converting between direct current of the drive battery 220 and alternating current of each of the generator MG1 and motor MG2.

The hybrid vehicle 10 includes a battery control unit (hereinafter, referred to as battery ECU) 260, the engine ECU 280, an MG-ECU 300 and the HV-ECU 320.

The battery ECU 260 manages and controls a charge or discharge state of the drive battery 220. The engine ECU 280 controls the operating state of the engine 120. The MG-ECU 300 controls the battery ECU 260, the inverter 240, and the like, in accordance with the state of the hybrid vehicle 10. The HV-ECU 320 manages and controls the battery ECU 260, the engine ECU 280, the MG-ECU 300, the brake ECU 340, and the like, in a coordinated manner and controls an overall hybrid system so that the hybrid vehicle 10 can operate at the highest efficiency.

An accelerator position sensor 346 and a shift position sensor 344 are connected to the HV-ECU 320. The accelerator position sensor 346 detects the position of an accelerator pedal 345. The shift position sensor 344 detects the position of a shift lever 343. The shift position sensor 344 transmits a shift position signal to the HV-ECU 320. The shift position signal indicates the position of the shift lever 343.

A converter 242 is provided between the drive battery 220 and the inverter 240. The converter 242 steps up the voltage of the drive battery 220 in accordance with a vehicle speed, and outputs the stepped-up voltage to the inverter 240.

The hybrid vehicle 10 further includes the driving support ECU 330, the brake ECU 340 and the friction brake 358.

The driving support ECU 330 executes cruise control or pre-crash safety control. The cruise control is control for following up a preceding vehicle at the same speed. The pre-crash safety control is control for activating the automatic brake control when a collision object is detected.

The driving support ECU 330 receives signals indicating a situation around the vehicle from an inter-vehicle sensor 332 and a camera 334 that captures surroundings of the vehicle, and receives a driver's cruise control activation request from a cruise control switch 333. The driving support ECU 330 executes cruise control or pre-crash safety control on the basis of a received inter-vehicle distance and a video or image acquired by the camera 334.

The friction brake 358 includes a brake rotor 352, a brake caliper 354 and a brake actuator 350. The brake rotor 352 is fixed to a rotary shaft of the corresponding drive wheel 160 and rotates together with the corresponding drive wheel 160. The brake caliper 354 is provided so as to sandwich the brake rotor 352 in a direction parallel to the rotary shaft by using hydraulic pressure. The brake actuator 350 adjusts hydraulic pressure, which is supplied to the brake caliper 354, with the use of a solenoid, or the like, on the basis of a control signal from the brake ECU 340.

A wheel speed sensor 356 is connected to the brake ECU 340. The wheel speed sensor 356 detects the rotation speed of the corresponding drive wheel 160. The wheel speed sensor 356 transmits, to the brake ECU 340, a signal indicating the rotation speed of the corresponding drive wheel 160. In addition, a brake pedal stroke sensor 342 is connected to the brake ECU 340. The brake pedal stroke sensor 342 detects the operation amount of the brake pedal 341. The brake pedal stroke sensor 342 transmits, to the brake ECU 340, a signal indicating the operation amount of the brake pedal 341. Instead of the brake pedal stroke sensor 342, a depression force detection sensor (for example, a master cylinder pressure sensor) that detects a driver's depression force on the brake pedal 341 may be used.

The brake ECU 340 calculates a total braking force (total braking force) corresponding to a driver's intention on the basis of the received operation amount of the brake pedal 341. The total braking force is calculated so as to increase in proportion to an increase in the operation amount of the brake pedal 341. The total braking force is cooperatively ensured by a combination of friction braking force (hydraulic braking force) that is generated by the friction brake 358 with regenerative braking force (electric braking force) that is generated by regenerative torque of the motor generator MG2.

For example, when the brake ECU 340 receives the operation amount of the brake pedal 341, the brake ECU 340 calculates the total braking force, and sets a required value of regenerative braking force to a level according to the operation amount of the brake pedal 341. The brake ECU 340 transmits the set required value of regenerative braking force to the HV-ECU 320. The HV-ECU 320 determines a regenerative braking force to be generated in accordance with the received required value of regenerative braking force, the state of charge of the drive battery 220, whether regenerative braking is limited, and the like, and executes regenerative control over the motor MG2 so that the determined regenerative braking force is achieved. The HV-ECU 320 transmits the determined regenerative braking force to the brake ECU 340. The brake ECU 340 controls the brake actuator 350 so that an insufficient amount for the total braking force, excluding the braking force of engine brake and the determined regenerative braking force, is ensured by the friction braking force that is generated by using the friction brake 358.

In FIG. 1, the ECUs of the control unit 20 are separately formed; instead, an ECU that integrates two or more ECUs may be included.

The accelerator pedal 345 is provided at a driver seat, and the accelerator position sensor 346 detects the depression amount of the accelerator pedal 345. The accelerator position sensor 346 outputs, to the HV-ECU 320, a signal indicating the depression amount of the accelerator pedal 345. The HV-ECU 320 controls the output of the engine 120 or the amount of electric power generated via the generator MG1, the motor MG2 and the engine ECU 280 in accordance with a required driving force corresponding to the depression amount.

A planetary gear train is used as the power split mechanism 200 in order to distribute the power of the engine 120 to both the drive wheels 160 and the generator MG1. By controlling the rotation speed of the generator MG1, the power split mechanism 200 also functions as a continuously variable transmission.

In the hybrid vehicle 10 on which the hybrid system shown in FIG. 1 is mounted, in the case where the efficiency of the engine 120 is low, for example, at the start of the vehicle or during low-speed traveling, the hybrid vehicle 10 is propelled by only the motor MG2 out of the motor generators MG1, MG2; whereas, during ordinary traveling, for example, the power of the engine 120 is distributed by the power split mechanism 200 to two routes, the drive wheels 160 are directly driven through one of the routes, and the generator MG1 is driven to generate electric power through the other one of the routes. At this time, the drive wheels 160 are assisted in rotation by driving the motor MG2 with electric power to be generated. During high-speed traveling, the output of the motor MG2 is increased by further supplying the motor MG2 with electric power from the drive battery 220, and driving force is added to the drive wheels 160.

On the other hand, during deceleration or during braking operation, the motor MG2 that is driven by the drive wheels 160 functions as a generator to regenerate electric power, and recovered electric power is stored in the drive battery 220. When the amount of charge of the drive battery 220 decreases and charging is particularly required, the amount of electric power generated by the generator MG1 is increased by increasing the output of the engine 120, thus increasing the amount of charge of the drive battery 220. Of course, even during low-speed traveling, there is a case where control for increasing the driving force of the engine 120 is executed where necessary. This is, for example, a case where charging of the drive battery 220 is required as described above, a case where an auxiliary, such as an air conditioner, is driven, a case where the temperature of coolant of the engine 120 is increased to a predetermined temperature, or the like.

In addition, in the hybrid vehicle 10 on which the hybrid system shown in FIG. 1 is mounted, the engine 120 is stopped in order to improve the fuel consumption depending on the operating state of the vehicle and the state of the drive battery 220. Thereafter, the operating state of the vehicle and the state of the drive battery 220 are detected, and the engine 120 is restarted by using the generator MG1.

Figure 2A:
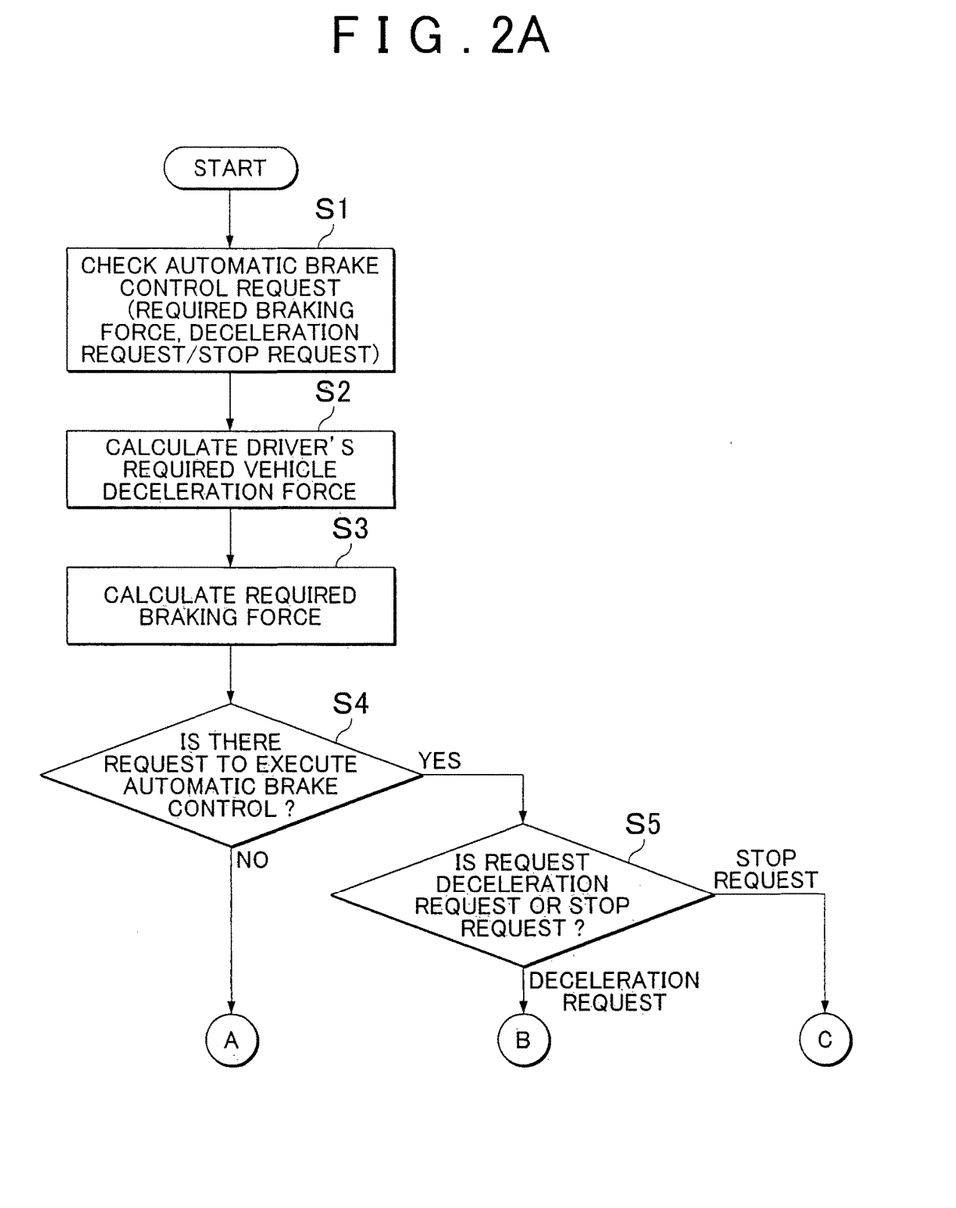
FIG. 2 is a flowchart for illustrating control over a brake ECU.
Figure 2B:
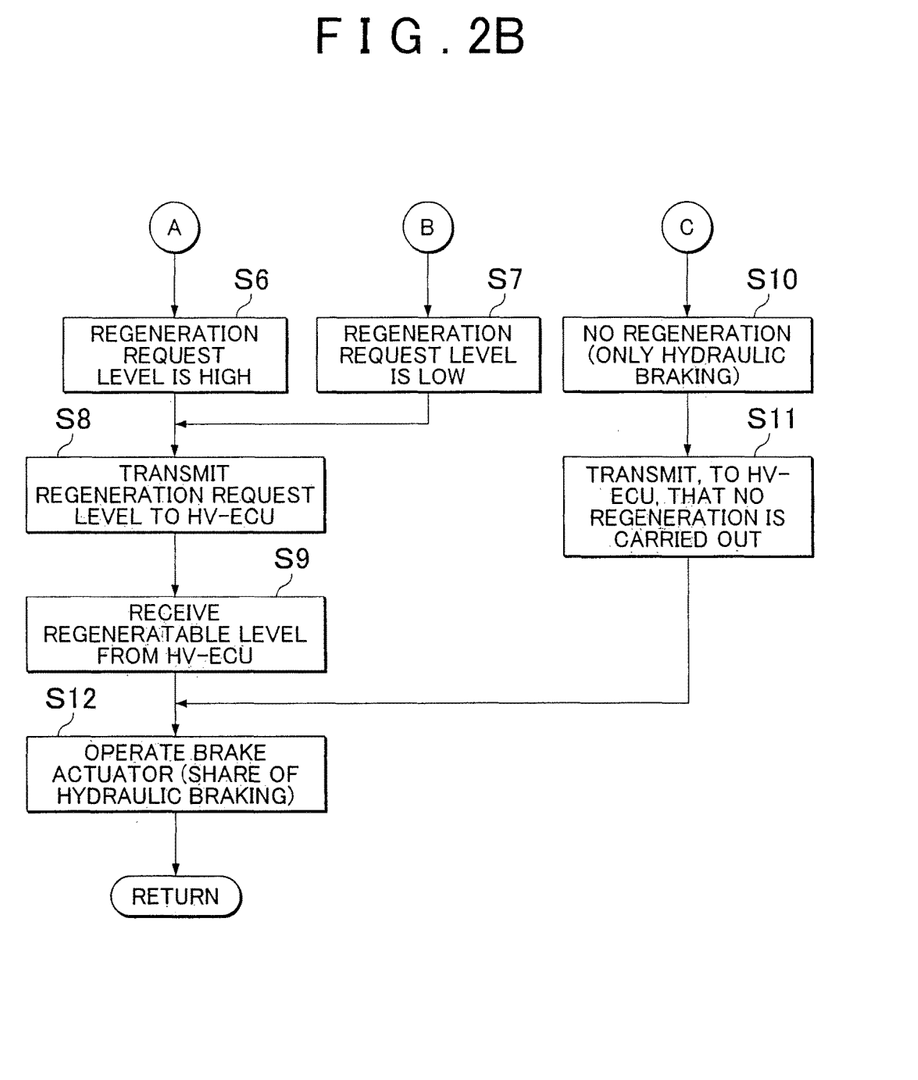

FIG. 2 is a flowchart for illustrating control of the brake ECU 340. The process of the flowchart is called from a main routine and executed at intervals of a constant time or each time a predetermined condition is satisfied.

As shown in FIG. 1 and FIG. 2, when the process of the flowchart is started, requirements for automatic brake control are initially checked in step S1. The driving support ECU 330 determines the requirements for automatic brake control on the basis of the inter-vehicle information detected by the inter-vehicle sensor 332, the video captured by the camera 334 that monitors a situation ahead of the vehicle (or surroundings), the setting of the cruise control switch 333, and the like, and transmits the determined requirements to the brake ECU 340 or the HV-ECU 320 via a controller area network (CAN).

The requirements for automatic brake control include, for example, the magnitude of required braking force, whether a request is the deceleration request or the stop request, and the like.

In step S1, the brake ECU 340 receives the requirements transmitted from the driving support ECU 330, and checks the requirements.

Subsequently, in step S2, the brake ECU 340 calculates a driver's required vehicle deceleration force. Specifically, the brake ECU 340 receives the driver's operation amount of the brake pedal 341 from the brake pedal stroke sensor 342. The brake ECU 340 calculates the driver's required deceleration force on the basis of the operation amount. In step S3, the brake ECU 340 calculates a required braking force of the automatic brake or the driver's deceleration request.

In step S4, the brake ECU 340 determines whether there is a request for automatic brake. Specifically, it is determined whether there is a request to execute automatic brake control in the requirements transmitted from the driving support ECU 330 in step S1. The request to execute automatic brake control includes the deceleration request and the stop request. When the driving support ECU 330 detects that a preceding vehicle has decelerated during preceding vehicle follow-up traveling, the driving support ECU 330 generates the deceleration request as shown in FIG. 5. When the driving support ECU 330 detects a collision object having a possibility of collision with the vehicle, the driving support ECU 330 generates the stop request as shown in FIG. 4.

When there is no request to execute automatic brake control in step S4, the process proceeds to step S6, and the brake ECU 340 sets a regeneration request level to "high".

When there is a request to execute automatic brake control in step S4, the brake ECU 340 determines in step S5 whether the request to execute automatic brake control is the deceleration request or the stop request. When the request to execute automatic brake control is the deceleration request in step S5, the process proceeds to step S7, and the brake ECU 340 sets the regeneration request level to "low" (level lower than the regeneration request level of step S6).

When the regeneration request level is set in step S6 or step S7, the process proceeds to step S8, and the brake ECU 340 transmits the regeneration request level to the HV-ECU 320. In step S9, the brake ECU 340 receives that regenerative braking having the transmitted regeneration request level is allowed (or regeneratable level) back from the HV-ECU 320. The brake ECU 340 determines the remaining braking force, obtained by subtracting the regenerative braking force from the total braking force, as the braking force that is shared by the friction brake 358.

On the other hand, when the request to execute automatic brake control is the stop request in step S5, the process proceeds to step S10, and the brake ECU 340 sets the regeneration request level to zero (no regeneration). In step S11, the brake ECU 340 transmits, to the HV-ECU 320, that no regeneration is carried out. In this case, because the braking force that is shared by the friction brake 358 is the total braking force, the process proceeds to step S10 without waiting for a response from the HV-ECU 320 in step S9.

When reception of the regeneratable level from the HV-ECU 320 in step S9 has completed or when transmission of information in step S11 that no regeneration is carried out has been completed, the process proceeds to step S12. In step S12, the brake actuator 350 is operated so as to generate the braking force that is shared by the friction brake 358.

Figure 3:
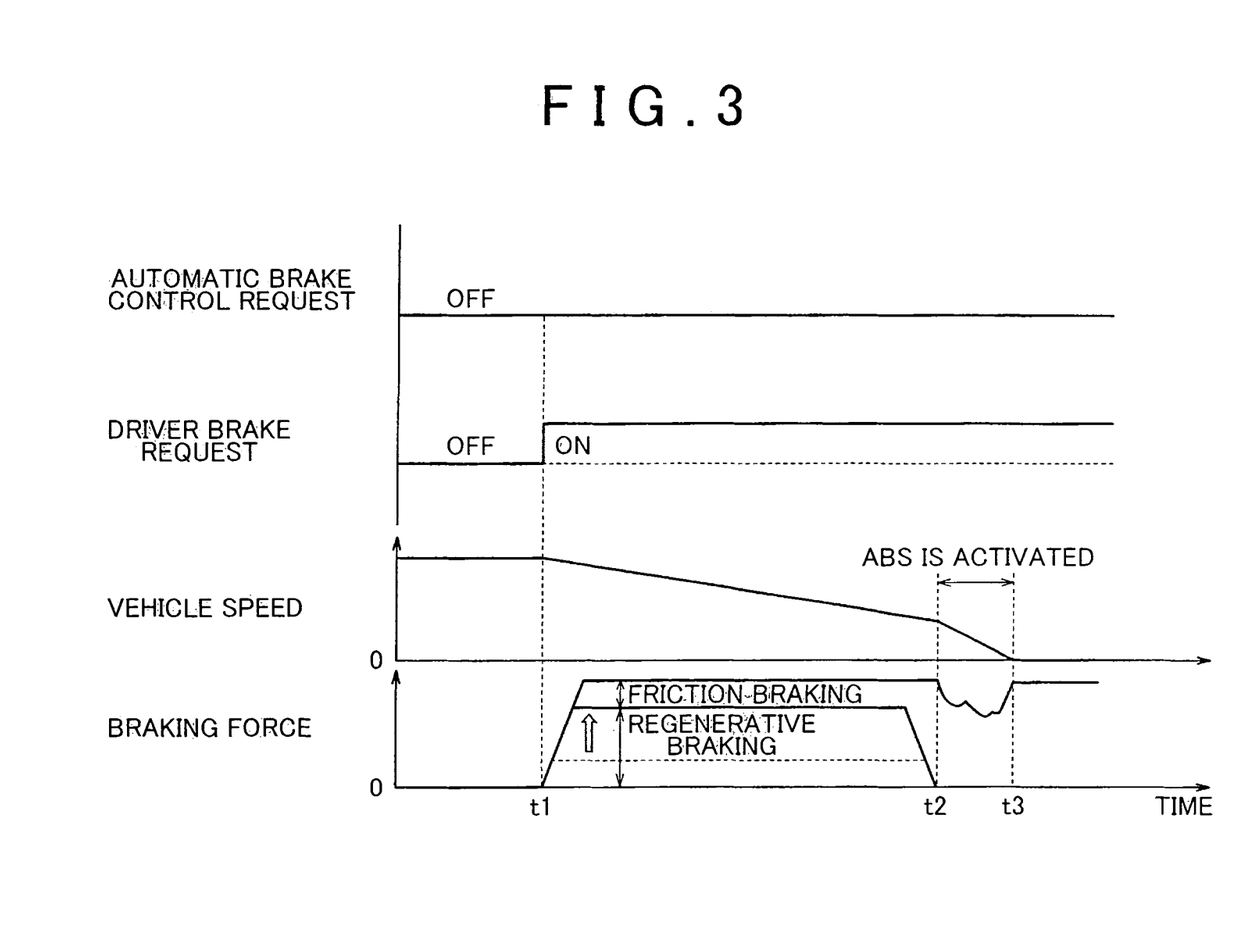
FIG. 3 is an operation waveform chart of brake control during normal times (when automatic brake is in an off state)

Hereinafter, an example of each of control during normal times, control when the stop request is issued and control when the deceleration request is issued will be described with reference to a corresponding one of waveform charts. FIG. 3 is an operation waveform chart of brake control during normal times (when automatic brake control is in an off state). The case where the driving support ECU 330 does not issue a request to execute automatic brake control will be described with reference to FIG. 1 and FIG. 3. At time t1, in response to the fact that the driver starts depressing the brake pedal 341, the operation amount is input from the brake pedal stroke sensor 342 to the brake ECU 340. Because the operation amount has increased from zero, a driver brake request changes from an off state to an on state.

The brake ECU 340 calculates the total braking force and the regeneration request level on the basis of the operation amount, and transmits the regeneration request level to the HV-ECU 320 via the CAN. When regeneration is allowed, the HV-ECU 320 transmits, to the brake ECU 340, that regeneration is allowed. For example, when the SOC of the drive battery 220 has reached an upper limit value or when the temperature of the drive battery 220 is not an adequate temperature, the HV-ECU 320 transmits, to the brake ECU 340, that regeneration is not allowed.

FIG. 3 shows the case where regeneration is allowed. From time t1 to time t2, a regenerative braking force having a predetermined proportion is generated by the regenerative brake, and the remaining part (friction braking force) obtained by subtracting the regenerative braking force from the total braking force is generated by the friction brake.

After that, when a slip of any one of the wheels is detected before time t2, replacement of the braking force of regenerative braking with the braking force of friction braking is carried out toward time t2. Between time t2 and time t3, an anti-lock brake system (ABS) is activated, and the braking force is adjusted. At time t3, the vehicle stops.

FIG. 4 is an operation waveform chart of brake control when pre-crash brake is activated (when the stop request is issued). The case where the driving support ECU 330 outputs the stop request as a request to execute automatic brake control will be described with reference to FIG. 1 and FIG. 4. At time t11, the driving support ECU 330 outputs the stop request to the brake ECU 340 in response to detection of a collision object. The brake ECU 340 detects that the stop request has changed from the off state to the on state at time t11.

As a result, the brake ECU 340 determines that no regeneration is carried out (the regeneration request level is set to zero), and transmits, to the HV-ECU 320 via the CAN, that no regeneration is carried out. The HV-ECU 320 does not carry out regenerative braking.

Thus, the total braking force is entirely the friction braking force after time t11, and is generated by the friction brake.

After that, even when a slip of any one of the wheels is detected before time t12, because it is determined that no regeneration is carried out from the beginning, it is not required to replace the braking force of regenerative braking with the braking force of friction braking. Because the replacement is not required, it is possible to quickly activate the ABS. Between time t12 and time t13, the anti-lock brake system (ABS) is activated, and the braking force is adjusted. At time t13, the vehicle stops.

The hybrid vehicle or the electric vehicle is intended to increase energy efficiency by carrying out regenerative braking during braking as much as possible. However, there is a case where the braking distance extends if regenerative torque during braking is excessively increased.

Particularly, during such sudden braking that the ABS is activated, it is conceivable that the regenerative braking force is once entirely replaced with the hydraulic braking force and then the ABS is activated. This is because ABS control with the use of the motor is difficult, whereas ABS control with the user of the friction brake has been established and, therefore, application is easy.

Although it is not possible to acquire all the cases of sudden braking in advance, it is known in advance that the vehicle is intended to stop even at the braking start timing, for example, when a collision object is detected in pre-crash control. In such a case, it is better to improve the performance of braking even when the fuel consumption is sacrificed.

In the present embodiment, when the stop request of automatic brake control is issued, ABS control is executed from the start of braking with only the friction brake (hydraulic brake). As a result, because there is no change from the regenerative brake to the friction brake, it is possible to reduce a time required at the time of a change for communication among the brake ECU (the required braking force is detected from the brake stroke, and the share of regeneration is required), the HV-ECU (whether regeneration is allowed is transmitted in response) and the brake ECU (hydraulic braking control of the share of hydraulic pressure).

Thus, in the present embodiment, by executing control as shown in FIG. 2 and FIG. 4, braking performance at the time of an emergency automatic stop is improved.

FIG. 5 is an operation waveform chart of brake control when the deceleration request is issued during automatic cruise control. The case where the driving support ECU 330 outputs the deceleration request as a request to execute automatic brake control will be described with reference to FIG. 1 and FIG. 5. At time t21, when the driving support ECU 330 detects deceleration of a preceding vehicle that the vehicle is following up, the driving support ECU 330 outputs the deceleration request to the brake ECU 340. At time t21, the brake ECU 340 detects that the deceleration request has changed from the off state to the on state.

As a result, the brake ECU 340 determines the regeneration request level having a lower proportion than the regeneration request level shown in FIG. 4, and transmits the regeneration request level to the HV-ECU 320 via the CAN. When regeneration is allowed, the HV-ECU 320 transmits, back to the brake ECU 340, that regeneration is allowed. For example, when the SOC of the drive battery 220 has reached an upper limit value or when the temperature of the drive battery 220 is not an adequate temperature, the HV-ECU 320 transmits, back to the brake ECU 340, that regeneration is not allowed.

FIG. 5 shows the case where regeneration is allowed. From time t21 to time t23, a regenerative braking force having a predetermined proportion is generated by the regenerative brake, and the remaining part (friction braking force) obtained by subtracting the regenerative braking force from the total braking force is generated by the friction brake.

Subsequently, the braking force decreases to zero from time t22 to time t23 in response to the fact that the deceleration request is changed from the on state to the off state at time t22, deceleration completes at time t23, and follow-up traveling is continued at the same vehicle speed as the preceding vehicle.

When the inter-vehicle distance is acquired by the inter-vehicle sensor 332 and the driving support ECU 330, a time required to change into hydraulic braking during sudden braking can be short if the proportion of regenerative braking force is suppressed in advance at the time when the preceding vehicle approaches the vehicle.

For example, the following two points are conceivable as the reason. 1) The rate of increase in friction braking force depends on the performance of the brake actuator 350 (for example, a solenoid valve that executes hydraulic control). The friction braking force just can be increased at a certain slope. Employment of an actuator having a high performance only for this purpose leads to high cost.

2) In changing from the regeneration brake to the hydraulic brake, there is a concern that, when the proportion of each of the brakes is steeply increased or reduced in an extremely short time, the total braking force significantly fluctuates if the control timing deviates. Thus, it is preferable to take a time to some extent for changing.

In a case where a situation that an emergency stop may occur (for example, approach of a preceding vehicle during follow-up traveling) is detected, it is possible to complete changing from regenerative braking to friction braking in a short time by setting the proportion of the regenerative braking force in advance, so it is possible to quickly activate the ABS even when there occurs an emergency stop.

In the present embodiment, the brake pedal stroke sensor 342 corresponds to a "brake operation detector". The ordinary brake control corresponds to "first brake control". The automatic brake control corresponds to "second brake control". The brake ECU 340, the HV-ECU 320 and the driving support ECU 330 correspond to an "ECU". Of these, the brake ECU 340 corresponds to a "first ECU", the HV-ECU 320 corresponds to a "second ECU". The inter-vehicle sensor 332 and the camera 334 correspond to a "vehicle surrounding situation detector". In the present embodiment, a case where the brake ECU 340 executes the process of determining the proportion of regenerative/friction braking is illustrated. Instead, the total braking force determined by the brake ECU 340 may be transmitted to the HV-ECU 320, and the process of determining the proportion of regenerative/friction braking may be executed by the HV-ECU 320. In such a case as well, similar advantageous effects are obtained.

The embodiment described above should be regarded as only illustrative in every respect and not restrictive. The scope of the invention is defined by the appended claims rather than the description of the above embodiment. The scope of the invention is intended to encompass all modifications within the scope of the appended claims and equivalents thereof.

What is claimed is:

1. A vehicle comprising:
   a brake operation detector configured to detect a driver's brake operation amount;
   a friction brake;
   a regenerative brake;
   a first electronic control unit configured to:
      (a) determine based on the brake operation amount whether the driver's brake operation is being carried out;
      (b) when the electronic control unit determines that the driver's brake operation is not being carried out, automatically generate a stop request or a deceleration request for the vehicle in response to a condition of the vehicle, other than the brake operation amount; and
      (c) calculate a total braking force in response to the stop request or the deceleration request for the vehicle and control a braking force of the friction brake; and
   a second electronic control unit configured to:
      (d) control the regenerative brake in response to the stop request such that a proportion of a braking force of the regenerative brake within the total braking force is zero from the start of the brake control;
      (e) control the regenerative brake in response to the deceleration request such that a proportion of the braking force of the regenerative brake within the total braking force is larger than zero from the start of the brake control; and
      (f) calculate a regenerative braking force that is generated by the regenerative brake and transmit the regenerative braking force back to the first electronic control unit in response to a command received from the first electronic control unit,
   wherein the first electronic control unit is configured to, when the stop request is generated, control the friction brake irrespective of a response from the second electronic control unit such that the total braking force is entirely the friction braking force; and
   wherein the first electronic control unit is configured to, when the deceleration request is generated, control the friction brake based on the response from the second electronic control unit and the total braking force.

2. The vehicle according to claim 1, further comprising:
   a vehicle surrounding situation detector configured to detect deceleration of a preceding vehicle and a collision object having a possibility of collision with the vehicle, wherein
   the electronic control unit is configured to, when the vehicle surrounding situation detector detects that the preceding vehicle has decelerated during vehicle follow-up traveling, generate the deceleration request, and
   the electronic control unit is configured to, when the vehicle surrounding situation detector detects the collision object having a possibility of collision with the vehicle, generate the stop request.

3. The vehicle according to claim 2, wherein
   the vehicle surrounding situation detector includes an inter-vehicle sensor and a camera configured to monitor a situation ahead of the vehicle.

* * * * *